Dec. 23, 1952  O. J. ZOBEL  2,623,120
MICROWAVE FILTER
Filed April 20, 1950  3 Sheets-Sheet 1

INVENTOR
O. J. ZOBEL
BY
Ralph T. Holcomb
ATTORNEY

Dec. 23, 1952  O. J. ZOBEL  2,623,120
MICROWAVE FILTER
Filed April 20, 1950  3 Sheets-Sheet 2

INVENTOR
O. J. ZOBEL
BY
Ralph T. Holcomb
ATTORNEY

Dec. 23, 1952          O. J. ZOBEL          2,623,120

MICROWAVE FILTER

Filed April 20, 1950          3 Sheets-Sheet 3

INVENTOR
O. J. ZOBEL
BY
*Ralph T. Holcomb*
ATTORNEY

Patented Dec. 23, 1952

2,623,120

UNITED STATES PATENT OFFICE 2,623,120

MICROWAVE FILTER

Otto J. Zobel, Morristown, N. J., assignor to Bell Telephone Laboratories, Incorporated, New York, N. Y., a corporation of New York Application April 20, 1950, Serial No. 156,959

40 Claims. (Cl. 178—44)

This invention relates to wave transmission networks and more particularly to microwave filters and impedance transformers.

An object of the invention is to provide a microwave filter in which the width and the location of the transmission band may be preassigned at will.

Another object is to increase the relative band width obtainable in such a filter.

Other objects are to increase the discrimination, improve the uniformity of transmission in the band, and simplify the construction of microwave filters.

Another object is to provide a wide-band microwave impedance transformer which may have any desired transformation ratio.

A further object is to provide such a transformer having image impedances suitable for connecting a microwave filter to a wave guide.

The microwave filters and transformers of the present invention are composite structures made up of individual sections which are designed on the basis of their image parameters, that is, the transfer constant and image impedances. Structurally, the network comprises a hollow-pipe wave guide of uniform cross section with shunt impedances, either inductive or capacitive, located at spaced intervals. These impedances take the form of partial obstructions across the wave guide and may, for example, be apertured transverse partitions, often called irises.

The network sections may be either of the mid-guide type, constituted by a section of wave guide with a centrally positioned iris, or the mid-iris type, made up of two like irises at the respective ends of a section of wave guide. Such a section has a transmission band the limits of which are determined by the length of the guide and the impedance of the iris. Composite filter structures are built up by connecting in tandem any number of such sections, usually all of the same type, having the same image impedance and the same transmission band. The band width obtainable is limited only by the transmission characteristic of the component wave guide. Any desired discrimination may be obtained by providing a sufficient number of sections.

The transformers are made up or two or more tandem sections which differ in image impedance. The sections may be all of the same type or they may be mixed in type. The location of the transmission band may be chosen at will. Any desired transformation ratio may be obtained.

The transformer has image impedances which are well suited to matching a microwave filter of the type described above to a wave guide. An important combination in accordance with the invention is a wave filter, made up of any number of like mid-guide or mid-iris sections, with a transformer at each end for matching the image impedance of the filter to the characteristic impedance of the wave guide used in the filter sections. In this structure the wave guide used in the filter and the transformers may be of the same cross section as that of the input and output wave guides, thus simplifying the connections. The filter and the transformers will ordinarily have substantially the same transmission band. The impedance match may be made very close over a wide band, thus assuring a very flat insertion loss characteristic throughout the band. Two such transformers connected back-to-back, with the central filter sections omitted, also provide a good band-pass characteristic.

The nature of the invention will be more fully understood from the following detailed description and by reference to the accompanying drawings, of which.

*Properties of wave guides and irises*

Before deriving the design formulas applicable to the microwave filter and transformer structures of the present invention, the properties of the associated wave guide itself and of irises will first be briefly considered. In the following discussion it will be assumed that the wave guide is a hollow metallic pipe of uniform, rectangular cross section and is transmitting electromagnetic waves of the $TE_{1,0}$ mode. Such a guide 50 is shown in cross section in Fig. 3. The transverse dimensions $a$ and $b$ are unequal, $a$ usually being approximately equal to $2b$. The electric field E, the direction of which is indicated by the arrow, is perpendicular to the longer dimension $a$. It is to be understood, however, that, with appropriate modifications, the design method is applicable to wave guides having other cross-sectional shapes, for example, circular.

Figure 3:
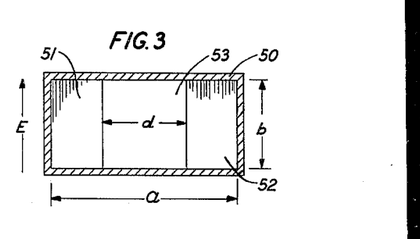
Figs. 3 and 5 show, respectively, an inductive iris and a capacitive iris in a wave guide of rectangular cross section.

A guide such as 50 transmits electromagnetic waves selectively like a high-pass filter but in various modes. For the $TE_{1,0}$ mode the critical or cut-off frequency $f_c$ is given by the expression $$f_c = c/2a \quad (1)$$

where $c$ is the velocity of light and is equal to $3 \times 10^{10}$ centimeters per second. At this frequency the critical wavelength $\lambda_c$ is equal to $2a$.

The propagation constant, $\gamma$, above $f_c$ is $$\gamma = \alpha + i\beta \quad (2)$$

where the attenuation constant, $\alpha$, is here negligible and the phase constant, $\beta$, at any frequency, $f$, is $$\beta = \frac{2\pi f_c}{c}\sqrt{(f/f_c)^2 - 1} \quad (3)$$

The characteristic impedance, $k$, may be written $$k = \frac{k_\infty}{\sqrt{1-(f_c/f)^2}} \quad (4)$$

where $k_\infty$ is the characteristic impedance at infinite frequency. Thus, for design purposes the wave guide can be treated as a non-dissipative transmission line having the propagation constant and characteristic impedance given above.

When an iris, or thin apertured metal diaphragm, is inserted transversely across a wave guide, it more or less obstructs the passage of a wave and can be considered as a two-terminal impedance shunted across the transmission line. Since dissipation may usually be neglected in the design process, the impedance of such an iris will be designated by $iX$. The frequency characteristic of the reactance X depends upon the type of opening in the iris, as will be seen below.

*General periodic structure*

Figures 1, 2:
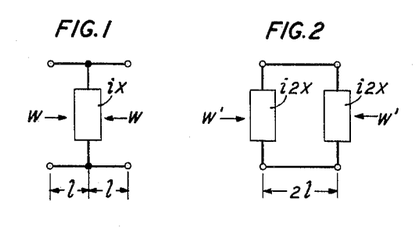
Figs. 1 and 2 are schematic representations, respectively, of a mid-guide and a mid-iris wave filter section.

The general periodic structure under consideration comprises a uniform wave guide with identical irises, each of impedance $iX$, inserted within the guide at regular intervals with a spacing of $2l$ between irises. For purposes of analysis the structure may be divided into identical minimum symmetrical sections. If the points of division are taken at the mid-points of the connecting lengths of guide, the sections are of the mid-guide type shown schematically in Fig. 1. Such a section comprises a section of wave guide of length $2l$ with an iris of impedance $iX$ connected in shunt at the center. The image impedance at each end of the mid-guide section is denoted by W. Alternatively, if the structure is sectioned at the mid-points of the irises, a mid-iris section, shown in Fig. 2, is obtained. The section consists of two irises, each of impedance $i2X$, separated by a section of wave guide of length $2l$. The image impedance at each end is W'.

The simplest method of deriving formulas for W and W', and the transfer constant T of either section, is to consider a mid-half section, obtained by dividing either the mid-guide or mid-iris section at its center. The mid-half section thus comprises a section of wave guide of length $l$ with an iris of impedance $i2X$ at one end thereof. It is an unsymmetrical structure with an image impedance W at the mid-guide end and an image impedance W' at the mid-iris end. The transfer constant of the mid-half section is half that of a full section, T, given by $$T = A + iB$$

where A is the attenuation constant and B is the phase constant of the full section. From standard formulas for the open-circuit and short-circuit driving-point impedances we arrive at the relation $$\tanh \tfrac{1}{2}T = \sqrt{\frac{\tan \beta l}{\tan (\beta l + \delta)}} \quad (5)$$

where $\delta$ is an angle determined by the iris impedance in accordance with the formula $$\tan \delta = 2X/k \quad (6)$$

The normalized mi-guide image impedance $w$, obtained by dividing the image impedance W by the characteristic impedance $k$ of the associated wave guide, is given by the expression $$w \equiv W/k = \sqrt{-\tan \beta l \tan (\beta l + \delta)} \quad (7)$$

Similarly, the normalized mid-iris image impedance, $w'$, is $$w' \equiv W'/k = \frac{\tan \delta}{\tan \beta l + \tan \delta}\sqrt{-\tan \beta l \tan (\beta l + \delta)} \quad (8)$$

$$= \sin \delta \sqrt{\frac{-\sin 2\beta l}{\sin 2(\beta l + \delta)}} \quad (9)$$

These two impedances are simply related.

*Wave-guide wave filter with inductive irises*

Fig. 3 shows one form of inductive iris suitable for use in the networks of the invention. The rectangular wave guide 50 with unequal transverse dimensions $a$ and $b$ is shown cross sectioned just ahead of the iris which is formed by the two halves 51, 52 of a thin, metallic, transverse partition with a central aperture 53 therebetween. The aperture 53 extends all the way between the wider sides of the guide 50 in the direction of the electric field E and has a width $d$ in the direction of the dimension $a$. It is to be understood, however, that the inductive iris may take other physical forms. For example, the aperture 53 may be circular or of other suitable shape.

Application of the above formulas will be made to the design of a wave filter with inductive irises of the type shown in Fig. 3, so that there will be a preassigned transmitting band above $f_c$ between the cut-off frequencies $f_1$ and $f_2$ which is not limited in width. For a given wave guide, $f_1$ and $f_2$ determine the two parameters of this structure, that is, the magnitude and spacing of the irises. This is the first design problem arising here.

The normalized susceptance of an inductive iris will be denoted by $s_i$, where the subscript $i$ means inductive. Similarly, when the subscript $i$ is applied to the symbols X, $\delta$, $l$, A, T, B, $w$, and $w'$ it will have the same meaning. Since $s_i$ is negative and proportional to the wavelength, $\lambda_g$, in the wave guide, we may put $$s_i = -\lambda_g/ag_i = -2/g_i\sqrt{(f/f_c)^2-1} \quad (10)$$

where $\lambda_g = 2\pi/\beta$ and $g_i$ is a positive design constant fixing the magnitude of the susceptance. Then $$X_i = -\frac{k}{s_i} = \frac{1}{2}g_i k_\infty (f/f_c) \quad (11)$$

which has the frequency characteristic of an inductive reactance. Substitution in the general formula 6 gives $$\tan \delta_i = 2X_i/k = g_i\sqrt{(f/f_c)^2-1} \quad (12)$$

which shows that $\delta_i$ is positive with the inductive iris.

Figure 4:
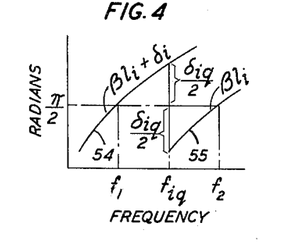
Figs. 4 and 6 show phase-frequency characteristics associated, respectively, with an inductive iris and a capacitive iris, referred to in explaining the invention.

The selective properties of the wave filter can be visualized from the phase-frequency characteristics of $\beta l_i + \delta_i$, given by curve 54 of Fig. 4, and $\beta l_i$, shown as curve 55. In the transmitting band where the attenuation constant $A_i = 0$, $T_i = iB_i$, $w_i$ and $w'_i$ are real, the functions tan $(\beta l_i + \delta_i)$ and tan $\beta l_i$ are of opposite signs. At the preassigned limits of $f_1$ and $f_2$ of the lowest band under consideration these tangents are, respectively, infinite. At $f_{iq}$, defined here as the quarter-wave frequency where the phase constant of the section has the value $B_{iq} = \pi/2$ radians, tan $(\beta l_i + \delta_i)$ and tan $\beta l_i$ are equal and opposite. Hence, at $f_1$, $\quad \beta_1 l_i = \pi/2 - \delta_{i1} \quad (13)$ $\quad\quad\quad B_{i1} = 0 \quad (14)$ at $f_{iq}$, $\quad \beta_q l_i = \pi/2 - \delta_{iq}/2 \quad (15)$ $\quad\quad\quad B_{iq} = \pi/2 \quad (16)$ and at $f_2$, $\quad \beta_2 l_i = \pi/2 \quad (17)$ $\quad\quad\quad B_{i2} = \pi \quad (18)$ In Equations 13 and 14 the subscript 1 used with the symbols B, $\beta$, and $\delta$ indicates that the value of the angle at the frequency $f_1$ is to be taken, and similarly in Equations 17 and 18 the subscript 2 associated with B and $\beta$ indicates the value at $f_2$. In Equations 15 and 16 the subscript $q$ means that the value of the angle at the frequency $f_{iq}$ is to be used.

For convenience, I shall define two radian angles which arise here with inductive irises, namely, $$\theta_i \equiv \pi\sqrt{\frac{(f_1/f_c)^2-1}{(f_2/f_c)^2-1}} \quad (19)$$

and $$\varphi_i \equiv \pi\sqrt{\frac{(f_{iq}/f_c)^2-1}{(f_2/f_c)^2-1}} \quad (20)$$

Then $$2\beta_q l_i = \varphi_i = \pi - \delta_{iq} \quad (21)$$

From preceding formulas $\theta_i$ and $\varphi_i$ can be shown to be related according to the transcendental equation $$\tan(-\varphi_i)/\varphi_i = 1/\theta_i \tan(\theta_i/2) \quad (22)$$

This gives an implicit interrelation among the four frequencies $f_c$, $f_1$, $f_{iq}$, and $f_2$ from which any one can be obtained numerically when the other three are known. Thus when $f_c$, $f_1$, and $f_2$, and hence $\theta_i$, are specified, $\varphi_i$ is fixed; whence also $$\frac{f_{iq}}{f_c} = \sqrt{\left(\frac{\phi_i}{\pi}\right)^2\left[\left(\frac{f_2}{f_c}\right)^2-1\right]+1} \quad (23)$$

The two design constants, given in terms of $\varphi_i$ and $f_{iq}/f_c$ for reasons stated later, are $$g_i = \frac{\tan(\pi-\phi_i)}{\sqrt{(f_{iq}/f_c)^2-1}} \quad (24)$$

and $$l_i = \frac{a\phi_i}{2\pi\sqrt{(f_{iq}/f_c)^2-1}} \quad (25)$$

For an infinitely thin inductive iris, of the type shown in Fig. 3, $$s_i = -\frac{\lambda_g}{a}\cot^2\left(\frac{\pi d}{2a}\right) \quad (26)$$

Then $$g_i = \tan^2\left(\frac{\pi d}{2a}\right) \quad (27)$$

and the width $d$ of the aperture may be found from the relationship $$\frac{d}{a} = \frac{2}{\pi}\tan^{-1}\sqrt{g_i} \quad (28)$$

A simple correction for the thickness of the partition 51, 52 can be made, if required, from measured curves of the ratio $-as_i/\lambda_g = 1/g_i$ plotted against $d/a$ for various thicknesses.

At the quarter-wave frequency $f_{iq}$ the normalized image impedance $w_{iq}$ for the mid-guide section becomes $$w_{iq} = \tan(\varphi_i/2), >1 \quad (29)$$

and the corresponding impedance $w'_{iq}$ for the mid-iris section is $$w'_{iq} = \sin \varphi_i, <1 \quad (30)$$

Since $0 < \delta_{iq} < \pi/2 < \varphi_i < \pi$, the former impedance is greater than, and the latter obviously less than, unity. The narrower the band, the greater the departure of each from unity. As $\varphi_i$ is obtainable simply from either image impedance, $f_{iq}$ and either $w_{iq}$ or $w'_{iq}$ can serve as another pair of parameters from which to determine $g_i$ and $l_i$. Such a pair plays an important part in the invention when combining dissimilar sections.

Another important formula which will be used later is that for the slope of the phase constant, $B'_{iq}$, at the frequency $f_{iq}$, given by $$B'_{iq} \equiv \left(\frac{dB_i}{df}\right) f_{iq} = \frac{f_{iq}}{f_{iq}^2 - f_c^2} D_i \quad (31)$$

where $$D_i \equiv \frac{\varphi_i}{\cos(\varphi_i - \pi/2)} + \sin(\varphi_i - \pi/2) \quad (32)$$

This slope is positive, which agrees with my phase constant theorem that "the phase constant in a wave-filter always increases with frequency throughout each transmitting band," first stated on page 5 and proved on page 37 of my article entitled, "Theory and design of uniform and composite electric wave-filters," published in the Bell System Technical Journal, January 1923.

At any frequency $$\beta l_i = \frac{\varphi_i}{2\sqrt{(f_{iq}/f_c)^2 - 1}} \sqrt{(f/f_c)^2 - 1} \quad (33)$$

and $$\delta_i = \tan^{-1}[g_i \sqrt{(f/f_c)^2 - 1}] \quad (34)$$

which involve only the ratios of frequencies to $f_c$.

*Wave-guide wave filter with capacitive irises*

Figure 5:
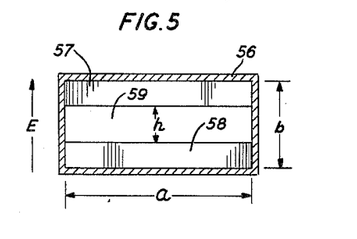

A type of capacitive iris suitable for use in the networks of the invention is shown in Fig. 5. The rectangular wave guide 56 is cross-sectioned just ahead of the iris which is formed by the two halves 57, 58 of a thin, metallic, transverse partition with a central aperture 59 therebetween. The aperture 59 extends all the way between the narrower sides of the guide 56 in the direction of the dimensions $a$ and has a width $h$ in the direction of the electric field $E$. The capacitive iris may, of course, take any other appropriate physical form.

Proceeding in the same manner as above, design formulas for a filter section using capacitive irises will now be presented. The subscript $c$ used with the symbols $s$, $g$, $X$, $\delta$, $l$, $B$, $w$, and $w'$ indicates that the symbol applies to a capacitive-iris filter section.

The normalized susceptance $s_c$ of a thin capacitive iris of the type shown in Fig. 5 is positive and inversely proportional to the guide wavelength, $\lambda_g$. Put $$s_c \equiv 4a/g_c \lambda_g = \frac{2}{g_c} \sqrt{(f/f_c)^2 - 1} \quad (35)$$

where $g_c$ is a positive constant which fixes the magnitude of the susceptance. Then $$X_c = -\frac{k}{s_c} = -\frac{1}{2} \frac{g_c k_\infty}{f/f_c - f_c/f} \quad (36)$$

which approaches the reactance of a strict capacity as the ratio $f/f_c$ increases above unity. It follows that $$\tan \delta_c \equiv \frac{2X_c}{k} = -\frac{g_c}{\sqrt{(f/f_c)^2 - 1}} \quad (37)$$

showing that $\delta_c$ is negative with the capacitive iris.

Figure 6:
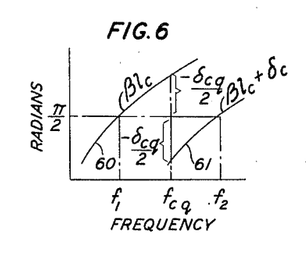

Fig. 6 shows the phase-frequency characteristic of $\beta l_c$ as curve 60 and that of $\beta l_c + \delta_c$ as curve 61. For the transmitting band we have the following relationships, which differ from those relating to the inductive type given above:

at $f_1$, $$\beta_1 l_c = \pi/2 \quad (38)$$
$$B_{c1} = -\pi \quad (39)$$

at the quarterwave frequency $f_{cq}$, $$\beta_q l_c = \pi/2 - \delta_{cq}/2 \quad (40)$$
$$B_{cq} = -\pi/2 \quad (41)$$

and at $f_2$, $$\beta_2 l_c = \pi/2 - \delta_{c2} \quad (42)$$
$$B_{c_2} = 0 \quad (43)$$

Define here for use with capacitive irises the two radian angles $$\theta_c \equiv \pi \sqrt{\frac{(f_2/f_c)^2 - 1}{(f_1/f_c)^2 - 1}} \quad (44)$$

and $$\varphi_c \equiv \pi \sqrt{\frac{(f_{cq}/f_c)^2 - 1}{(f_1/f_c)^2 - 1}} \quad (45)$$

Then $$2\beta_q l_c = \varphi_c = \pi - \delta_{cq} \quad (46)$$

The angles $\theta_c$ and $\varphi_c$ are related according to the transcendental equation $$\varphi_c \tan \varphi_c = \theta_c / \tan(-\theta_c/2) \quad (47)$$

which interrelates the four frequencies $f_c$, $f_1$, $f_{cq}$ and $f_2$. Hence $$\frac{f_{cq}}{f_c} = \sqrt{\left(\frac{\varphi_c}{\pi}\right)^2 \left[\left(\frac{f_1}{f_c}\right)^2 - 1\right] + 1} \quad (48)$$

The two design constants are given by $$g_c = \tan(\varphi_c - \pi)\sqrt{(f_{cq}/f_c)^2 - 1} \quad (49)$$

and $$l_c = \frac{a\varphi_c}{2\pi\sqrt{(f_{cq}/f_c)^2 - 1}} \quad (50)$$

A comparison of Figs. 4 and 6 readily shows that for the same transmitting band the spacing of the capacitive irises must be greater than that of the inductive irises, their ratio being $$\frac{l_c}{l_i} = \frac{\beta_2}{\beta_1} = \sqrt{\frac{(f_2/f_c)^2 - 1}{(f_1/f_c)^2 - 1}}, > 1 \quad (51)$$

For a thin symmetrical iris of the type shown in Fig. 5

$$s_c = \frac{4b}{\lambda_g} \log_e \csc\left(\frac{\pi h}{2b}\right) \quad (52)$$

whence $$g_c = a/b \log_e \csc\left(\frac{\pi h}{2b}\right) \quad (53)$$

and $$\frac{h}{b} = \frac{2}{\pi} \sin^{-1} e^{-a/b s_c} \quad (54)$$

Corrections for thickness of the capacitive iris can be made, if necessary.

At the quarter-wave frequency $f_{cq}$ the normalized image impedance $w_{cq}$ for the mid-guide section is $$w_{cq} = \tan(-\varphi_c/2), > 1 \quad (55)$$

and the corresponding impedance $w'_{cq}$ for the mid-iris section is $$w'_{cq} = \sin(-\varphi_c), < 1 \quad (56)$$

since $-\pi/2 < \delta_{cq} < 0$ and $\pi < \varphi_c < 3\pi/2$.

The slope of the phase constant $B'_{cq}$ at the frequency $f_{cq}$ is $$B'_{cq} \equiv \left(\frac{dB_c}{df}\right) f_{cq} = \frac{f_{cq}}{f_{cq}^2 - f_c^2} D_c \quad (57)$$

where $$D_c \equiv \frac{\varphi_c}{\sin(\varphi_c - \pi)} + \cos(\varphi_c - \pi) \quad (58)$$

At any frequency $f$ $$\beta l_c = \frac{\varphi_c}{2\sqrt{(f_{cq}/f_c)^2-1}}\sqrt{(f/f_c)^2-1} \quad (59)$$

and $$\delta_c = -\tan^{-1}(g_c/\sqrt{(f/f_c)^2-1}) \quad (60)$$

I wish to point out here that for the same $f_c$ and $f_{iq}=f_{cq}$ the coefficients of $D_i$ and $D_c$ in Formulas 31 and 57, respectively, are identical and independent of band width for all inductive and capacitive type sections. This common property simplifies the application of these formulas where the ratios of phase slopes appear.

Wave-guide impedance transformers

It will be seen from Formulas 29, 30 and 55, 56 that the image impedances of the wave-guide wave-filter sections described above, both inductive and capacitive, differ from the characteristic impedance $k$ of the associated wave guide at frequencies near the center of their transmitting bands. These departures increase as the band widths are narrowed.

Any such section having a real normalized image impedance, $w$, can be connected to the wave guide of normalized characteristic impedance, $l$, without impedance irregularity by the well-known method of inserting between them a single non-dissipative quarter-wave line or symmetrical section whose impedance at this frequency is the geometric mean of the two impedances to be connected, that is, $\sqrt{w}$. Then the impedances in the two directions at each junction are matched, thus allowing maximum transfer of energy across the junctions. However, these impedances match only at the one frequency, becoming more or less mismatched at frequencies departing from it. Such mismatches produce reflection losses and a narrow transmitting band as in a simple resonant circuit. This 1-section method of impedance matching is therefore usually inadequate for matching over a frequency range. To accomplish the latter more satisfactorily a more complex structure is required.

To fill this need the present invention, therefore, presents dissymmetrical wave-guide structures which function as impedance-transforming wave-guide wave filters. The method of design is based upon the use of image parameters which I introduced on page 611 of my article entitled "Transmission characteristics of electric wave-filters," published in the Bell System Technical Journal, October 1924. Here the transformer is designed so that its image impedances match the terminal impedances, assumed to be real, exactly at a single frequency near the center of the desired transmitting band. These image impedances, which are here real and vary slowly with frequency, continue to match the terminal impedances approximately over an appreciable frequency band, which results in good transmission through the transformer.

Figure 7:
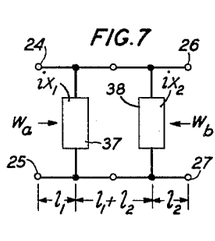
Fig. 7 shows schematically a band-pass impedance transformer in accordance with the invention comprising two dissimilar mid-guide sections connected in tandem.

The general transformer in accordance with the invention is made up of $n$ dissimilar sections, of the types described above, connected in tandem. All sections have identical associated wave guides, a property which facilitates their physical merger into a composite structure. For example, Fig. 7 shows schematically an embodiment in which $n=2$. The transformer comprises two dissimilar mid-guide sections of the type shown in Fig. 1 connected in tandem between a first pair of terminals 24, 25 and a second pair 26, 27. The first section consists of a wave guide of length $2l_1$ with a shunt branch 37 of impedance $iX_1$ connected at the mid-point. The second section is made up of a wave guide of length $2l_2$ with a central shunt branch 38 of impedance $iX_2$. The transformer has prescribed real image impedances $W_a$ at the terminals 24, 25 and $W_b$ at the terminals 26, 27 at a specified frequency near the center of a transmitting band. To ensure the location of such a transmitting band, all sections are required to have the same quarter-wave frequency, $f_q=f_{iq}=f_{cq}$, equal to this preassigned frequency, irrespective of the widths of their individual transmitting bands. Since each of the $n$ sections has two parameters, a total of $2n$ relations is necessary to fix them. Such general relations which apply to the $n$-section transformer at the preassigned frequency, $f_q$, are here taken to be the following (omitting from the $T$'s, $w$'s etc., the subscripts, $i$, $iq$, etc., and the exponent "prime" and adding the subscript numbers, 1, 2, . . ., $n$, to identify the sections):

$$T_1 = \pm i\pi/2, \ldots, T_n = \pm i\pi/2 \quad (61)$$

$$\frac{w_2}{w_1} = p_1 \frac{w_3}{w_2} = \ldots = p_{n-1}\frac{w_n}{w_{n-1}} \quad (62)$$

where $p_1, \ldots, p_{n-2}$ are arbitrary positive parameters which relate the ratios of successive image impedances to the ratio of the impedances of the first two sections nearest terminals 24, 25, $$\sqrt{x_a y_a} = w_a \equiv W_a/k \quad (63)$$

and $$\sqrt{x_b y_b} = w_b \equiv W_b/k \quad (64)$$

Here $x_a$, $y_a$ and $w_a$ are, respectively, the normalized open-circuit, short-circuit and image impedances of the transformer at terminals 24, 25 of section 1, while $x_b$, $y_b$ and $w_b$ are the corresponding ones at terminals 26, 27 of section $n$. It will be seen that Formulas 61 to 64 contain the necessary $2n$ relations.

From the impedance-invention property of a succession of quarter-wave sections satisfying 61 (see Formula 67) we have a simple relation between the two image impedances of the transformer in terms of those of the $n$ sections, namely if $n$ is even, $$w_a = \frac{w_1^2 w_3^2 \ldots w_{n-1}^2}{w_2^2 w_4^2 \ldots w_n^2} w_b \quad (65)$$

and if $n$ is odd, $$w_a = \frac{w_1^2 w_3^2 \ldots w_n^2}{w_2^2 w_4^2 \ldots w_{n-1}^2} \frac{1}{w_b} \quad (66)$$

Hence, when working out formulas for any particular number of sections, (65) or (66) may replace (64), thereby eliminating the necessity of repeating the longer process of obtaining expressions for $x_b$ and $y_b$ when those for $x_a$ and $y_a$ have already been found. A similar statement would, of course, apply to Formula 63 instead of 64.

To derive expressions for $x_a$ and $y_a$ in terms of the image parameters, $T$ and $w$, of each of the $n$ symmetrical sections, it is necessary to apply the general formula $$z = w\frac{z_t + w \tanh T}{w + z_t \tanh T} \quad (67)$$

where $z$ is the normalized input impedance of a section when terminated by the normalized impedance $z_t$. This is to be applied successively at each junction, beginning at the $n$th section. Although these expressions become more and more complicated as $n$ increases, their product, $x_a y_a$, simplifies at the quarter-wave frequency, $f_q$, where for each section $\tanh T = \pm i\infty$, but it contains various ratios of these infinite hyperbolic tangents, which are of indeterminate form. The latter can, however, be evaluated readily by differentiating numerator and denominator to give, for example, $$\text{Limit at } f_q \left( \frac{\tanh T_1}{\tanh T_2} = \frac{\tan B_1}{\tan B_2} \right) = \frac{B'_2}{B'_1} = \frac{D_2}{D_1} \quad (68)$$

by Formulas 31, 57 or both, depending upon the types of iris. That is, as the frequency approaches $f_q$, $B_1$ and $B_2$ each approach $\pm \pi/2$ by assumption in (61) but not at the same rate, and although the tangent of each approaches infinity, the ratio of these tangents approaches a finite positive value given by (68).

To illustrate the above procedure, general formulas will now be obtained for 2-section, 3-section, and 4-section transformers. Similar formulas can be derived for cases where $n$ is greater than 4.

Figure 8:
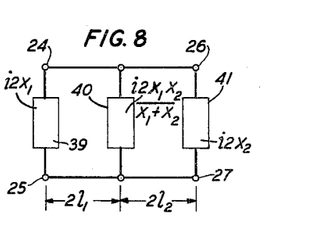
Fig. 8 represents a similarly-constituted transformer made up of two dissimilar mid-iris sections.
Figure 13:
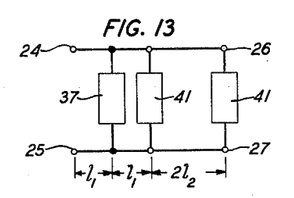
Figs. 13 to 16 represent transformers made up of tandem connected, mixed combinations of dissimilar sections, these being in Fig. 13 a mid-guide and a mid-iris, in Fig. 14 two mid-guide and a mid-iris, in Fig. 15 a mid-guide and two mid-iris, and in Fig. 16 two mid-guide and two mid-iris sections.

There will first be considered the 2-section transformer, one embodiment of which is shown in Fig. 7 and others in Figs. 8 and 13. The structure shown schematically in Fig. 8 comprises two dissimilar mid-iris sections of the type shown in Fig. 2 connected in tandem between the terminals 24, 25 at one end and the terminals 26, 27 at the other end. The first section consists of a wave guide of length $2l_1$ with a shunt branch 39 of impedance $i2X_1$ at the left end and a similar branch at the other end. The second section is made up of a wave guide of length $2l_2$ with a shunt branch 41 of impedance $i2X_2$ at the right end and a similar branch at the other end. The two central shunt branches are merged into a single branch 40 of impedance $i2X_1X_2/(X_1+X_2)$. In the transformer of Fig. 13, the first section of Fig. 7 and the second section of Fig. 8 are connected in tandem to form a mixed combination.

For a 2-section transformer, two applications of (67) for $x_a$ and two for $y_a$ give $$x_a = w_1 \frac{w_1 \tanh T_1 + w_2 \coth T_2}{w_1 + w_2 \tanh T_1 \coth T_2} \quad (69)$$

and $$y_a = w_1 \frac{w_1 \tanh T_1 + w_2 \tanh T_2}{w_1 + w_2 \tanh T_1 \tanh T_2} \quad (70)$$

At the design frequency, $f_q$, their product reduces to $$w_a^2 = x_a y_a = \frac{w_1^3}{w_2} \frac{w_2 + w_1 \tanh T_1 / \tanh T_2}{w_1 + w_2 \tanh T_1 / \tanh T_2} \quad (71)$$

and from (65)

$$w_2/w_1 = \sqrt{w_b/w_a} \quad (72)$$

Combining these with (68) we find the fundamental formulas for two sections to be $$w_1 = w_a^{3/4} w_b^{1/4} U_2 \quad (73)$$

and $$w_2 = w_a^{3/4} U_2 \quad (74)$$

where $$U_2 \equiv \sqrt{\frac{D_1 + (w_b/w_a)^{1/2} D_2}{(w_b/w_a)^{1/2} D_1 + D_2}} \quad (75)$$

It will be seen from Formulas 29, 30, 32, 55, 56, and 58, depending upon the terminations and irises of the two sections, that $w_1$, $D_1$ and $w_2$, $D_2$ are functions only of the radian angles, $\varphi_1$ and $\varphi_2$, respectively, of the two sections. The pair of simultaneous Equations 73 and 74, subject to 75, are sufficient to determine $\varphi_1$ and $\varphi_2$. Because of the transcendental nature of these formulas, more explicit ones for $\varphi_1$ and $\varphi_2$ cannot be given, but for any physical numerical values of $w_a$ and $w_b$, they can be solved readily by a method of successive approximations of $U_2$, beginning with $U_2 = 1$.

These values of the $\varphi$'s, together with the preassigned value of $f_q/f_c$, fix the design constant $g$ and the length $2l$ of each of the transformer sections. If the section has an inductive iris, Equations 24 and 25 are used. If the iris is capacitive, Equations 49 and 50 are applicable.

Figure 9:
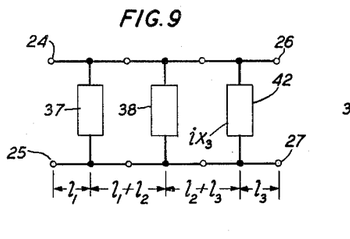
Figs. 9 and 10 show 3-section transformers in which the sections are, respectively, of the mid-guide type and the mid-iris type.
Figure 10:
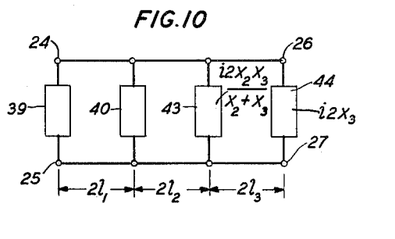
Figure 14:
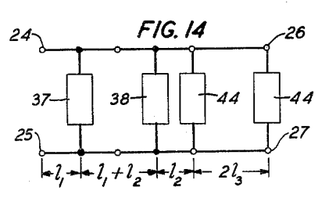
Figure 15:
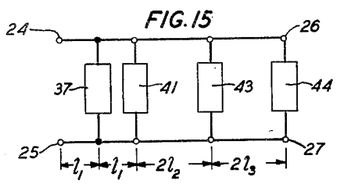

Figs. 9, 10, 14, and 15 show schematically four different 3-section transformers in accordance with the invention. In Fig. 9, all of the sections are of the mid-guide type, and in Fig. 10 they are all of the mid-iris type. The structure of Fig. 14 is made up of two mid-guide sections and one mid-iris, and Fig. 15 of one mid-guide and two mid-iris. Fig. 9 is obtained by adding to Fig. 7 a third section of length $2l_3$ with a branch 42 of impedance $iX_3$ connected in shunt at the mid-point. Fig. 10 is derived from Fig. 8 by adding a section of length $2l_3$ with a shunt branch 44 of impedance $i2X_3$ at the right end and a similar branch at the other end. The two parallel shunt branches at the junction of sections 2 and 3 are merged to form the branch 43 having an impedance of $i2X_2X_3/(X_2+X_3)$. In Fig. 14 a mid-iris section 3 of the type shown in Fig. 10 is added to the two mid-guide sections of Fig. 7. In Fig. 15 a similar mid-iris section 3 is added to the network of Fig. 13.

Design formulas for a 3-section transformer, examples of which are shown in Figs. 9, 10, 14, and 15, are $$w_1 = w_a U_3 \quad (76)$$

$$w_2 = p_1 (w_a w_b)^{1/2} \quad (77)$$

and $$w_3 = p_1 w_b / U_3 \quad (78)$$

where $$U_3 \equiv \sqrt{\frac{D_1 + (w_2/w_1) D_2 + p_1 D_3}{D_1 + (w_2/w_1)^{-1} D_2 + p_1^{-1} D_3}} \quad (79)$$

A numerical solution for $\varphi_1$, $\varphi_2$ and $\varphi_3$ is here also obtained by successive approximations, beginning with $U_3 = 1$.

Figure 11:
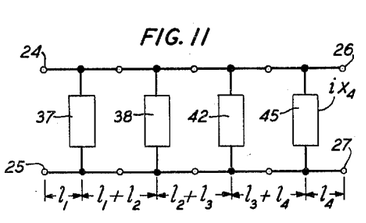
Figs. 11 and 12 represent 4-section transformers made up of mid-guide and mid-iris sections, respectively.
Figure 12:
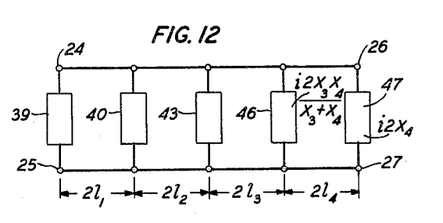
Figure 16:
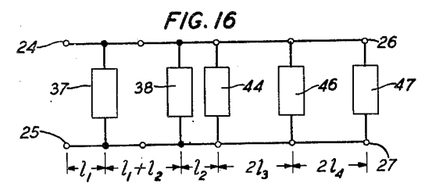

Figs. 11, 12, and 16 show schematically three different 4-section transformers in accordance with the invention. In Fig. 11 all of the sections are of the mid-guide type, in Fig. 12, they are of the mid-iris type, and in Fig. 16 two are mid-guide and two are mid-iris. Fig. 11 is obtained by adding to Fig. 9 a fourth section of length $2l_4$ with a branch 45 of impedance $iX_4$ connected in shunt at the mid-point. Fig. 12 is derived from Fig. 10 by adding a section of length $2l_4$ with a shunt branch 47 of impedance $i2X_4$ at the right end and a similar branch at the left end. The two parallel shunt branches at the junction of sections 3 and 4 are merged to form the branch 46 whose impedance is $i2X_3X_4/(X_3X_4)$. In Fig. 16 the transformer of Fig. 7 is substituted for the first two mid-iris sections of Fig. 12. Here the branch 44 has an impedance of $i2X_3$, the same as that of the like-designated branch in Fig. 10.

The following design formulas apply to the 4-section transformer, examples of which are shown in Figs. 11, 12, and 16.

$$w_1 = p_1^{1/2} p_2^{-1/4} w_a^{7/8} w_b^{1/8} U_4 \quad (80)$$

$$w_2 = p_1^{1/2} p_2^{1/4} w_a^{5/8} w_b^{3/8} U_4 \quad (81)$$

$$w_3 = p_1^{-1/2} p_2^{3/4} w_a^{3/8} w_b^{5/8} U_4 \quad (82)$$

and $$w_4 = p_1^{-1/2} p_2^{1/4} w_a^{1/8} w_b^{7/8} U_4 \quad (83)$$

where $$U_4 \equiv \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}} \quad (84)$$

To obtain $\varphi_1$, $\varphi_2$, $\varphi_3$, and $\varphi_4$ in a numerical case we again use successive approximations and start with $U_4 = 1$. The convergence to a solution is rapid.

These illustrative formulas indicate a tapering of the magnitudes of the section impedances between the network image impedances $w_a$ and $w_b$. Hence, when applying them some care is required in choosing the kinds of section, depending upon the magnitudes of $w_a$ and $w_b$, to ensure a physical solution with positive values of the $w$'s. A choice for each of the three cases arising is as follows:

Where $1 \leq w_a < w_b$, use mid-guide sections as in Figs. 7, 9 and 11.

Where $1 \geq w_a > w_b$, use mid-iris sections, as in Figs. 8, 10 and 12.

Where $w_a > 1 > w_b$, use mid-guide sections beginning at terminals 24, 25 and mid-iris ending at terminals 26, 27 in the approximate proportion of $w_a$ to $w_b$, as in Figs. 13, 14, 15 and 16.

The parameters $p_1$, $p_2$, etc., appearing in the formulas can be chosen so as to alter somewhat the width of the resulting transmitting band of the transformer and its impedance characteristics. Values of unity normally give good results.

An alternative to an extension of the above sets of formulas to larger values of $n$ would be the division of the total impedance range, $w_a$ to $w_b$, into two or more ranges and then a separate design for each range with any of the formulas already derived. The number of sections chosen for each range could be roughly proportional to the impedance ratio required. The division points might be taken, for example, so as to give the same transformer ratios for all. It is obvious that when these separate structures corresponding to the different impedance levels are connected in tandem they are joined on an image impedance basis and the total structure will have the desired image impedances, $w_a$ and $w_b$, at its terminals.

Where two dissimilar mid-iris sections are joined together there is a single merged impedance such as 40 in Fig. 8, for example. This has a reactance $X'$ given by $$X' = 2X_1 X_2/(X_1 + X_2) \quad (85)$$

which must be simulated by the proper iris. If both sections have inductive irises, $X'$ will be inductive; so from (11) and (85) the design constant $g_i'$ for the corresponding inductive iris is $$g_i' = 2 g_{i1} g_{i2}/(g_{i1} + g_{i2}) \quad (86)$$

If both sections have capacitive irises, the design constant $g_c'$ for the corresponding merged capacitive iris is by (36) and (85)

$$g_c' = 2 g_{c1} g_{c2}/(g_{c1} + g_{c2}) \quad (87)$$

If, however, one section is inductive and the other capacitive, $X'$ will be anti-resonant and have the design constants $g_i$ and $g_c$ of the two sections. In this case we can normalize (85) and obtain by (12) and (37) the normalized susceptance $s'$ of the required iris. It is $$s' \equiv -\frac{k}{X'} = -\frac{k}{2X_i} - \frac{k}{2X_c}$$

$$= -\frac{1}{g_i \sqrt{(f/f_c)^2 - 1}} + \frac{\sqrt{(f/f_c)^2 - 1}}{g_c} \quad (88)$$

This can be simulated in any particular case over the important frequency range by an anti-resonant iris having two parameters such as, for example, one having a central rectangular opening in the iris whose sides are parallel to those of the wave guide. (See page 121 of "Microwave Transmission Design Data," published by the Sperry Gyroscope Company, May 1944.) Fitting this at the design frequency $f_q$ and at $f_1$ or $f_2$ will be satisfactory.

An approximation can be made to (88) by fitting its value $s_q'$ at $f_q$ with an inductive iris when $s_q'$ is negative, and with a capacitive iris when $s_q'$ is positive. In the former case we would have from (10)

$$g_i' = -2/s_q' \sqrt{(f_q/f_c)^2 - 1} \quad (89)$$

and in the latter case from (35)

$$g_c' = 2 \sqrt{(f_q/f_c)^2 - 1}/s_q' \quad (90)$$

To exemplify the present invention, a specific design will here be outlined for a wave-guide wave filter together with a wave-guide transformer suitable for interconnecting the former to a wave guide having the same transverse dimensions.

Figure 17:
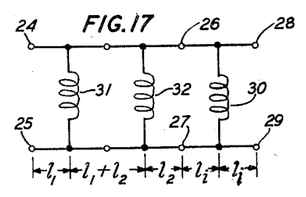
Fig. 17 is a schematic circuit of a network comprising a 2-section transformer and a filter section, in which all of the sections are of the mid-guide type and the associated shunt impedances are inductive.

The composite structure is shown schematically in Fig. 17. All of the sections are of the mid-guide type (Fig. 1) and have inductive irises such as the one shown in Fig. 3. The transformer, between terminals 24, 25 and 26, 27, has two sections. It is a special case of the circuit of Fig. 7 with the general shunt impedance branches 37 and 38 replaced, respectively, by the inductances 31 and 32. Only one filter section is shown, between terminals 26, 27 and 28, 29, but it will be understood that more sections may be added, if required. It consists of a wave guide of length $2l_i$ with a centrally-positioned shunt inductance 39. Since this filter section is of the mid-guide type, it is preferable that the transformer associated therewith terminate in a mid-guide section on the end connected to the filter. The transformers shown in Figs. 9, 11, 13, 14, 15, and 16 all have a mid-guide termination on at least one end and may, therefore, be substituted for the transformer shown in Fig. 17. On the other hand, if the filter terminates in a mid-iris section (Fig. 2) the transformer should have a mid-iris termination at the junction with the filter. Suitable transformers are shown in Figs. 8, 10, 12, 13, 14, 15, and 16.

It will be assumed that the component wave guide is rectangular in cross section and has an inside width $a$ of 4.758 centimeters (1.873 inches) and an inside height $b$ of 2.215 centimeters (0.872 inch). From Equation 1 the critical frequency of the guide is $$f_c = 3152.63 \text{ megacycles per second}$$

Its normalized characteristic impedance $w_g$ is, of course, unity at all frequencies.

It will be assumed that the filter is to have the following preassigned transmitting band limits, in megacycles per second:

$$f_1 = 3975.00$$

and $$f_2 = 4126.42$$

From (19), (22) and (23) we have $\theta_i = 2.85684$ radians, $\varphi_i = 2.99258$ radians and $f_{iq} = 4046.08$ megacycles per second. Substitution of these values in (24) and (25) gives the design constants $$g_i = 0.18663$$

and $$l_i = 1.1090 \text{ inches}$$

From (28) we obtain $d/a = 0.2596$, which when corrected from experimental curves for the thickness of the iris to be used (0.045 inch) gives $d/a = 0.291$ and $d = 0.545$ inch for the iris represented by the inductance 30. The normalized mid-guide image impedance at $f_{iq}$ becomes from (29) $w_{iq} = 13.3968$. All of the dimensions required for the construction of the filter section have thus been determined.

Figure 18:
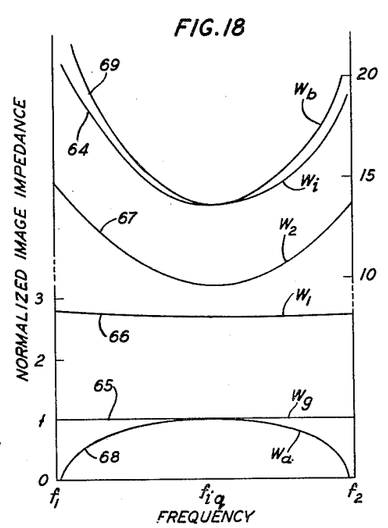
Fig. 18 gives the normalized image impedance-frequency characteristics of the wave guide, the filter, and the transformer sections shown in Fig. 17, and also the characteristic of the transformer sections in combination.

Fig. 18 gives certain impedance-frequency characteristics of interest. They are shown only in the transmitting band, between the cut-off frequencies $f_1$ and $f_2$. It should be noted that, as indicated, there is a break in the ordinate scale between the point 3 shown at the left, and the point 10 shown at the right. Curve 64 shows the normalized mid-guide image impedance $w_1$ of the filter section at terminals 26, 27 or 28, 29 of Fig. 17, found from Formula 7 used in conjunction with 33 and 34. The normalized characteristic impedance $w_g$ of the wave guide, which is unity at all frequencies, is shown by curve 65. The other characteristics will be discussed later.

The 2-section transformer shown in Fig. 17, between terminals 24, 25 and 26, 27, is to be designed at the frequency $f_q = f_{iq}$ so as to connect with the wave guide at terminals 24, 25 and the above wave filter at terminals 26, 27 without impedance irregularities. Hence, in addition to the values of $f_c$ and $f_q$ above, the transformer data at $f_q$ are $$w_a = w_g = 1.0$$

and $$w_b = w_{iq} = 13.3968$$

Applying Formulas 73 to 75, together with 29 and 32, for each section, we obtain the solution $$\varphi_1 = 2.42094; \quad \varphi_2 = 2.93644$$

where $U_2 = 1.38729$. From (24) and (25) the following design constants are obtained:

$$g_1 = 1.0917 \quad g_2 = 0.25866$$
$$l_1 = 0.8972 \text{ inch} \quad l_2 = 1.0883 \text{ inches}$$

Using (28), $d_1/a = 0.5140$ and $d_2/a = 0.2995$. When corrected for iris thickness these ratios are $d_1/a = 0.536$ and $d_2/a = 0.327$, giving $d_1 = 1.004$ inches for the iris associated with the first section and $d_2 = 0.612$ inch for the iris in the second section.

In Fig. 18 curves 66 and 67 show, respectively, the normalized image impedances $w_1$ and $w_2$ of the individual transformer sections of Fig. 17, computed in the same way as the characteristic 64. The normalized image impedance $w_a$ for the tandem combination of the two transformer sections, at the terminals 24, 25, is given by curve 68. This characteristic was computed in the same way as curves 64, 66 and 67, with the aid also of Formulas 5, 63, 69 and 70. Curve 69 gives the normalized image impedance $w_b$ for the transformer at the terminals 26, 27. This characteristic was computed by means of formulas similar to those used for curve 68 but with the subscripts $a$ and $b$, 1 and 2 interchanged. These various characteristics may be readily compared in Fig. 18. In particular, it is to be noted that $w_a$ not only equals $w_g$ at the quarter-wave frequency $f_{iq}$, of the wave filter but approximates it well over a considerable frequency range on either side. Also, the limits of the transmitting band of the transformer, itself a wave filter, occur where $w_a = 0$; here they are just within the filter band $f_1$, $f_2$. Likewise, $w_b$ equals $w_1$ at $f_{iq}$ and approximates it very well over the band. Hence, when these structures are connected in tandem, as shown in Fig. 17, there will be appreciable impedance irregularities only at the edges of the band, which would there cause minor ripples in an over-all transmission characteristic.

It is obvious also from Fig. 18 that in this example the curve 68 could be made to cross the curve 65 at two frequencies, one on either side of $f_{iq}$, by choosing at $f_{iq}$ a design value, $w_a > w_g = 1.0$. Similarly, the curve 69 could also be made to cross the curve 64 at two frequencies by taking a design value, $w_b < w_{iq}$. There would then be some impedance mismatches at the frequency $f_{iq}$. The above serves to indicate the flexibility of this method of design.

Figure 19:
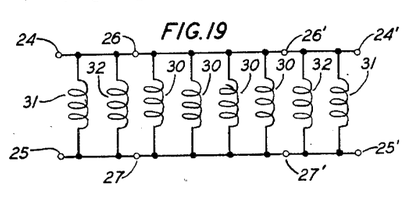
Fig. 19 is a schematic circuit of a network made up of two networks of the type shown in Fig. 17, connected back-to-back, with two additional filter sections of the same type inserted between them.

Fig. 19 shows schematically another composite network in accordance with the invention. It consists of two networks of the type shown in Fig. 17, connected back-to-back, with two additional mid-guide filter sections connected in tandem between them. Thus, in Fig. 19 the 2-section transformer at the left end between terminals 24, 25 and 26, 27 is identical with the transformer at the right end between terminals 24′, 25′ and 26′, 27′, and each is the same as the one shown in Fig. 17 between terminals 24, 25 and 26, 27. The four mid-guide filter sections between terminals 26, 27 and 26′, 27′ are all alike and each has a centrally-positioned shunt inductance 30. The transformers serve to match the image impedance of the filter sections to the characteristic impedance of the wave guide to which the network is connected at each end.

Figure 20:
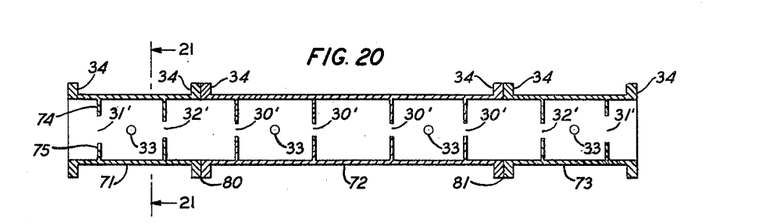
Fig. 20 is a longitudinal sectional view of a physical embodiment of the network shown in Fig. 19.
Figures 21, 22:
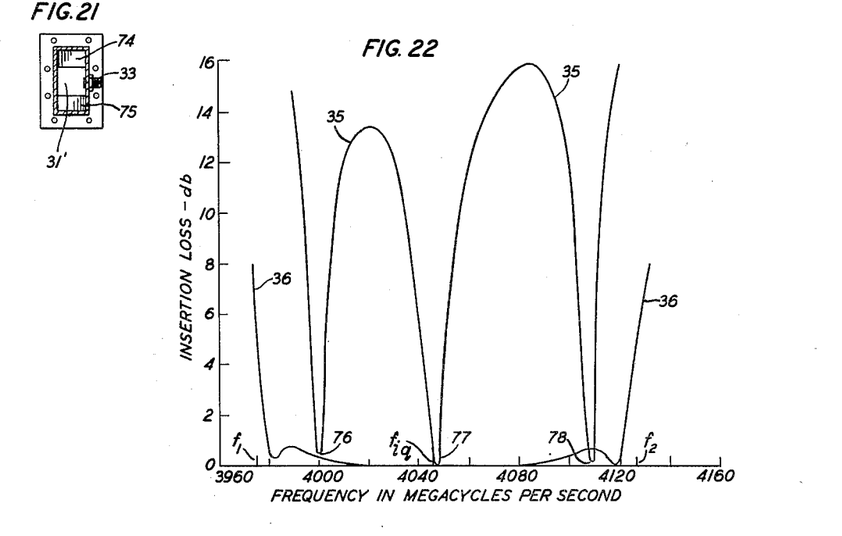
Fig. 21 is a transverse sectional view of the structure shown in Fig. 20, as seen at the plane 21—21 looking in the direction of the arrows.
Fig. 22 gives the insertion loss characteristic of the network of Fig. 20, between wave guide, and for comparison the corresponding characteristic of the four filter sections.

A physical embodiment of the network of Fig. 19 is shown in longitudinal section in Fig. 20 and in transverse section in Fig. 21. The component wave guide is rectangular in cross section and made in three sections 71, 72 and 73, connected in tandem by means of the end coupling flanges 34 and associated screws, not shown. The sections of guides 71 and 73 are associated, respectively, with the end transformers, and the interposed section 72 with the filter. The irises are of the inductive type shown in Fig. 3 and each is formed by the two halves 74, 75 of a thin, metallic, transverse partition with a central aperture therebetween extending all the way between the wider sides of the guide. The irises 30′, 31′ and 32′ correspond, respectively, to the inductances 30, 31 and 32 shown in Fig. 19. Four trimming screws 33 are provided for tuning the cavities with which they are associated, to adjust the transmission characteristic of the network, if desired. More trimming screws may, of course, be provided.

In Fig. 22 curve 36 is the insertion loss-frequency characteristic of the structure shown in Figs. 20 and 21 measured between wave guides having the same cross-sectional dimensions as the wave-guide sections 71, 72 and 73. The loss is small and nearly flat throughout the transmission band and the cut-offs are quite steep. To get this characteristic required slight adjustments of the trimming screws 33 and the addition of thin shims at the two junctions 80 and 81 between the flanges 34. For comparison, curve 35 of Fig. 22 gives the insertion loss characteristic obtained when the terminal transformers are omitted from the network. The high loss over most of the theoretical band is due mainly to the mismatch between the image impedance of the filter sections and the characteristic impedance of the guide connected thereto. At the points 76, 77 and 78 the loss is low because, at these frequencies, the phase constant of the filter is equal to an integral multiple of $\pi$ radians so that the filter becomes transparent, as shown by Formula 67. A comparison of the curves 35 and 36 shows the great improvement obtainable by terminating wave filters with impedance transformers designed in accordance with the present invention.

Figure 23:
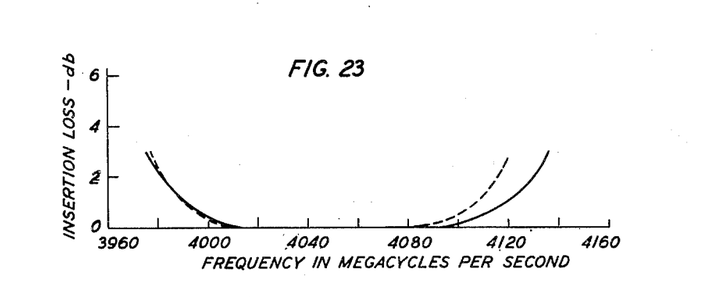
Fig. 23 gives the calculated and measured insertion loss characteristics of the two transformers of Fig. 20 connected back-to-back, with the filter sections omitted.

The transformers alone, connected back-to-back, also have a useful band-pass insertion loss characteristic. In Fig. 23 the solid-line curve is a measured characteristic and the broken-line curve is the theoretical computed one. The two characteristics may be brought into even closer agreement by the addition and adjustment of a trimming screw at the junction of the transformers.

Any of the transformers disclosed herein may, of course, be connected back-to-back, without any intervening filter sections, to provide band-pass structures. For example, a 4-section transformer of the type shown in Fig. 11 was designed with inductive irises for the same terminal impedances $w_a$ and $w_b$ as in the previous example of Fig. 17. It was first designed as two 2-section transformers in tandem which have the same impedance ratios and the same normalized image impedance, $\sqrt{w_a w_b} = 3.66016$, at their junction. The identical design was obtained later in one operation with Formulas 80 to 84 in which $p_1 = p_2 = 1.0$, meaning that the ratios of successive impedances at $f_{1q}$ are equal. Two of these 4-section transformers were constructed and, without any adjustment, measured back-to-back between wave guides. The measured insertion loss characteristic was found to be similar to the solid-line curve shown in Fig. 23, but more selective, with band limits close to $f_1$ and $f_2$ as desired.

The insertion loss L in decibels for the measured characteristics shown herein was obtained at each frequency by determining the voltage standing-wave ratio M in decibels and applying the readily derived conversion formula $$L = 20 \log_{10} \cosh \left[ \frac{M}{17.372} \right] \quad (91)$$

A convenient five-place tabulation of the function $\log_{10} \cosh u$ is given in Table 1 of the Smithsonian Mathematical Tables of Hyperbolic Functions.

What is claimed is:

1. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising three sections connected in tandem, each of said sections comprising a section of uniform wave guide of length $2l_n$ having a characteristic impedance equal to $k$, a critical frequency $f_c$, and a phase constant $\beta_q$ at said frequency and a centrally positioned shunt inductor having a positive design constant $g_n$ fixing the magnitude of its susceptance, and the $n$th section, where $n$ is successively equal to 1, 2 and 3, having a normalized image impedance $w_n$ at each end, where $$l_n = \varphi_n / 2\beta_q$$
$$g_n = \tan(\pi - \varphi_n) / \sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1 \sqrt{w_a w_b}$$
$$w_3 = p_1 w_b / U_3$$
$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, $$w_n = \tan(\varphi_n / 2)$$

and $$D_n = \frac{\varphi_n}{\cos(\varphi_n - \pi/2)} + \sin(\varphi_n - \pi/2)$$

2. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising three sections connected in tandem, each of said sections comprising a section of uniform wave guide of length $2l_n$ having a characteristic impedance equal to $k$, a critical frequency $f_c$, and a phase constant $\beta_q$ at said frequency and a centrally positioned shunt capacitor having a positive design constant $g_n$ fixing the magnitude of its susceptance, and the $n$th section, where $n$ is successively equal to 1, 2 and 3, having a normalized image impedance $w_n$ at each end, where $$l_n = \varphi_n / 2\beta_q$$
$$g_n = \tan(\varphi_n - \pi) \sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1 \sqrt{w_a w_b}$$
$$w_3 = p_1 w_b / U_3$$
$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, $$w_n = \tan(-\varphi_n / 2)$$

and $$D_n = \frac{\phi_n}{\sin(\phi_n - \pi)} + \cos(\phi_n - \pi)$$

3. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising three sections connected in tandem, each of said sections comprising a section of uniform wave guide of length $2l_n$ having a characteristic impedance equal to $k$, a critical frequency $f_c$, and a phase constant $\beta_q$ at said frequency and at the respective ends thereof two shunt inductors each having a positive design constant $g_n$ fixing the magnitude of its susceptance, and the $n$th section, where $n$ is successively equal to 1, 2 and 3, having a normalized image impedance $w_n$ at each end, where $$l_n = \varphi_n/2\beta_q$$

$$g_n = \tan(\pi - \varphi_n)\sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1 \sqrt{w_a w_b}$$
$$w_3 = p_1 w_b / U_3$$
$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, $$w_n = \sin \varphi_n$$

and $$D_n = \frac{\varphi_n}{\cos(\varphi_n - \pi/2)} + \sin(\varphi_n - \pi/2)$$

4. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising three sections connected in tandem, each of said sections comprising a section of uniform wave guide of length $2l_n$ having a characteristic impedance equal to $k$, a critical frequency $f_c$, and a phase constant $\beta_q$ at said frequency and at the respective ends thereof two shunt capacitors each having a positive design constant $g_n$ fixing the magnitude of its susceptance, and the $n$th section, where $n$ is successively equal to 1, 2 and 3, having a normalized image impedance $w_n$ at each end, where $$l_n = \varphi_n/2\beta_q$$

$$g_n = \tan(\varphi_n - \pi)\sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1 \sqrt{w_a w_b}$$
$$w_3 = p_1 w_b / U_3$$
$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, $$w_n = \sin(-\varphi_n)$$

and $$D_n = \frac{\varphi_n}{\sin(\varphi_n - \pi)} + \cos(\varphi_n - \pi)$$

5. A filter in accordance with claim 1 in which the constant $p_1$ is approximately equal to unity.

6. A filter in accordance with claim 1 in which $w_a$ is as least as large as unity, and $w_b$ is larger than $w_a$.

7. A filter in accordance with claim 2 in which the constant $p_1$ is approximately equal to unity.

8. A filter in accordance with claim 2 in which $w_a$ is at least as large as unity, and $w_b$ is larger than $w_a$.

9. A filter in accordance with claim 3 in which the constant $p_1$ is approximately equal to unity.

10. A filter in accordance with claim 3 in which $w_a$ is not larger than unity, and $w_b$ is smaller than $w_a$.

11. A filter in accordance with claim 4 in which the constant $p_1$ is approximately equal to unity.

12. A filter in accordance with claim 4 in which $w_a$ is not larger than unity, and $w_b$ is smaller than $w_a$.

13. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising the tandem combination of two adjacent sections of the same type and a section of different type, each of said sections comprising a uniform wave guide of length $2l_n$ having a characteristic impedance equal to $k$, a critical frequency $f_c$, and a phase constant $\beta_q$ at said frequency, one of said types of sections being of a first type comprising a centrally positioned shunt inductor, the other of said types of sections being of a second type comprising two shunt inductors positioned at the respective ends thereof, each of said inductors having a positive design constant $g_n$ fixing the magnitude of its susceptance and the $n$th section, where $n$ is successively equal to 1, 2 and 3, having a normalized image impedance $w_n$ at each end, where for each of said sections $$l_n = \varphi_n/2\beta_q$$

$$g_n = \tan(\pi - \varphi_n)/\sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1 \sqrt{w_a w_b}$$
$$w_3 = p_1 w_b / U_3$$
$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, and $$D_n = \frac{\varphi_n}{\cos(\varphi_n - \pi/2)} + \sin(\varphi_n - \pi/2)$$

$$w_n = \tan(\varphi_n/2)$$

for said first type of section; and $$w_n = \sin \varphi_n$$

for said second type of section.

14. A filter in accordance with claim 13 in which said two adjacent sections are of said first type.

15. A filter in accordance with claim 13 in which said two adjacent sections are of said second type.

16. A filter in accordance with claim 13 in which the constant $p_1$ is approximately equal to unity.

17. A filter in accordance with claim 13 in which $w_a$ is larger than unity, and $w_b$ is smaller than unity.

18. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising the tandem combination of two adjacent sections of the same type and a section of different type, each of said sections comprising a uniform wave guide of length $2l_n$ having a characteristic impedance equal to $k$, a critical frequency $f_c$, and a phase constant $\beta_q$ at said frequency, one of said types of sections being of a first type comprising a centrally positioned shunt capacitor, the other of said types of sections being of a second type comprising two shunt capacitors positioned at the respective ends thereof, each of said capacitors having a positive design constant $g_n$ fixing the magnitude of its susceptance, and the $n$th section, where $n$ is successively equal to 1, 2 and 3, having a normalized image impedance $w_n$ at each end, where for each of said sections $$l_n = \varphi_n/2\beta_q$$
$$g_n = \tan(\varphi_n - \pi)\sqrt{(f_q/f_c)^2 - 1}$$

and the angles $\varphi_1$, $\varphi_2$ and $\varphi_3$ corresponding respectively to the filter sections 1, 2 and 3 satisfy at said frequency the following equations:

$$w_1 = w_a U_3$$
$$w_2 = p_1\sqrt{w_a w_b}$$
$$w_3 = p_1 w_b/U_3$$

$$U_3 = \sqrt{\frac{D_1 + (w_2/w_1)D_2 + p_1 D_3}{D_1 + (w_1/w_2)D_2 + D_3/p_1}}$$

where $p_1$ is an arbitrary positive constant and $w_1$, $w_2$ and $w_3$ correspond respectively to the filter sections 1, 2 and 3, and $$D_n = \frac{\varphi_n}{\sin(\varphi_n - \pi)} + \cos(\varphi_n - \pi)$$
$$w_n = \tan(-\varphi_n/2)$$

for said first type of section; and $$w_n = \sin(-\varphi_n)$$

for said second type of section.

19. A filter in accordance with claim 18 in which said two adjacent sections are of said first type.

20. A filter in accordance with claim 18 in which said two adjacent sections are of said second type.

21. A filter in accordance with claim 18 in which the constant $p_1$ is approximately equal to unity.

22. A filter in accordance with claim 18 in which $w_a$ is larger than unity, and $w_b$ is smaller than unity.

23. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency and a centrally positioned shunt inductor having a positive design constant $g_n$ fixing the magnitude of its susceptance, and the $n$th section, where $n$ is successively equal to 1, 2, 3 and 4, having a normalized image impedance $w_n$ at each end, where $$l_n = \varphi_n/2\beta_q$$
$$g_n = \tan(\pi - \varphi_n)/\sqrt{(f_q/f_c)^2 - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$
$$w_2 = p_1^{1/2} p_2^{1/4} w_a^{5/8} w_b^{3/8} U_4$$
$$w_3 = p_1^{-1/2} p_2^{3/4} w_a^{3/8} w_b^{5/8} U_4$$

and $$w_4 = p_1^{-1/2} p_2^{1/4} w_a^{1/8} w_b^{7/8} U_4$$

where $$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, $$w_n = \tan(\varphi_n/2)$$

and $$D_n = \frac{\varphi_n}{\cos(\varphi_n - \pi/2)} + \sin(\varphi_n - \pi/2)$$

24. A filter in accordance with claim 23 in which the constants $p_1$ and $p_2$ are each approximately equal to unity.

25. A filter in accordance with claim 23 in which $w_a$ is at least as large as unity, and $w_b$ is larger than $w_a$.

26. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency and a centrally positioned shunt capacitor having a positive design constant $g_n$ fixing the magnitude of its susceptance, and the $n$th section, where $n$ is successively equal to 1, 2, 3 and 4, having a normalized image impedance $w_n$ at each end, where $$l_n = \varphi_n/2\beta_q$$
$$g_n = \tan(\varphi_n - \pi)\sqrt{(f_q/f_c) - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$
$$w_2 = p_1^{1/2} p_2^{1/4} w_a^{5/8} w_b^{3/8} U_4$$
$$w_3 = p_1^{-1/2} p_2^{3/4} w_a^{3/8} w_b^{5/8} U_4$$

and $$w_4 = p_1^{-1/2} p_2^{1/4} w_a^{1/8} w_b^{7/8} U_4$$

where $$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, $$w_n = \tan(-\varphi_n/2)$$

and $$D_n = \frac{\varphi_n}{\sin(\varphi_n - \pi)} + \cos(\varphi_n - \pi)$$

27. A filter in accordance with claim 26 in which the constants $p_1$ and $p_2$ are each approximately equal to unity.

28. A filter in accordance with claim 26 in which $w_a$ is at least as large as unity, and $w_b$ is larger than $w_a$.

29. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency and at the respective ends thereof two shunt inductors each having a positive design constant $g_n$ fixing the magnitude of its susceptance, and the $n$th section, where $n$ is successively equal to 1, 2, 3 and 4, having a normalized image impedance $w_n$ at each end, where $$l_n = \varphi_n/2\beta_q$$

$$g_n = \tan(\pi - \varphi_n)/\sqrt{(f_q/f_c)^2 - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$

$$w_2 = p_1^{1/2} p_2^{1/4} w_a^{5/8} w_b^{3/8} U_4$$

$$w_3 = p_1^{-1/2} p_2^{3/4} w_a^{3/8} w_b^{5/8} U_4$$

and $$w_4 = p_1^{-1/2} p_2^{1/4} w_a^{1/8} w_b^{7/8} U_4$$

where $$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, $$w_n = \sin \varphi_n$$

$$D_n = \frac{\varphi_n}{\cos(\varphi_n - \pi/2)} + \sin(\varphi_n - \pi/2)$$

30. A filter in accordance with claim 29 in which the constant $p_1$ is approximately equal to unity.

31. A filter in accordance with claim 29 in which $w_a$ is not larger than unity, and $w_b$ is smaller than $w_a$.

32. A microwave filter adapted to transmit a band of frequencies approximately centered at a frequency $f_q$ and having unequal real image impedances which, when normalized with respect to an impedance $k$, are equal to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency and at the respective ends thereof two shunt capacitors each having a positive design constant $g_n$ fixing the magnitude of its susceptance, and the $n$th section, where $n$ is successively equal to 1, 2, 3 and 4, having a normalized image impedance $w_n$ at each end, where $$l_n = \varphi_n/2\beta_q$$

$$g_n = \tan(\pi - \varphi_n)/\sqrt{(f_q/f_c)^2 - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$

$$w_2 = p_1^{1/2} p_2^{1/4} w_a^{5/8} w_b^{3/8} U_4$$

$$w_3 = p_1^{-1/2} p_2^{3/4} w_a^{3/8} w_b^{5/8} U_4$$

and $$w_4 = p_1^{-1/2} p_2^{1/4} w_a^{1/8} w_b^{7/8} U_4$$

where $$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, $$w_n = \sin(-\varphi_n)$$

and $$D_n = \frac{\varphi_n}{\sin(\varphi_n - \pi)} + \cos(\varphi_n - \pi)$$

33. A filter in accordance with claim 32 in which the constants $p_1$ and $p_2$ are each approximately equal to unity.

34. A filter in accordance with claim 32 in which $w_a$ is not larger than unity, and $w_b$ is smaller than $w_a$.

35. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency, two adjacent sections being of a first type comprising a centrally positioned shunt inductor, two adjacent sections being of a second type comprising two shunt inductors positioned at the respective ends thereof, each of said inductors having a positive design constant $g_n$ fixing the magnitude of its susceptance, and the $n$th section, where $n$ is successively equal to 1, 2, 3 and 4, having a normalized image impedance $w_n$ at each end, where for each of said sections $$l_n = \varphi_n/2\beta_q$$

$$g_n = \tan(\pi - \varphi_n)/\sqrt{(f_q/f_c)^2 - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$

$$w_2 = p_1^{1/2} p_2^{1/4} w_a^{5/8} w_b^{3/8} U_4$$

$$w_3 = p_1^{-1/2} p_2^{3/4} w_a^{3/8} w_b^{5/8} U_4$$

and
$$w_4 = p_1^{-1/2} p_2^{1/4} w_a^{1/8} w_b^{7/8} U_4$$
where
$$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, and $$D_n = \frac{\varphi_n}{\cos(\varphi_n - \pi/2)} + \sin(\varphi_n - \pi/2)$$

$$w_n = \tan(\varphi_n/2)$$

for said first type of section; and $$w_n = \sin \varphi_n$$

for said second type of section.

36. A filter in accordance with claim 35 in which the constants $p_1$ and $p_2$ are each approximately equal to unity.

37. A filter in accordance with claim 35 in which $w_a$ is larger than unity, and $w_b$ is smaller than unity.

38. A microwave filter adapted to transmit a band of frequencies approximately centered at a frequency $f_q$ and having unequal real image impedances which, when normalized with respect to an impedance $k$, are equal respectively to $w_a$ and $w_b$ at said frequency, said filter comprising four sections connected in tandem, each of said sections comprising a uniform wave guide of length $2l_n$ having a characteristic impedance equal to $k$, a critical frequency $f_c$, and a phase constant $\beta_q$ at said frequency, two adjacent sections being of a first type comprising a centrally positioned shunt capacitor, two adjacent sections being of a second type comprising two shunt capacitors positioned at the respective ends thereof, each of said capacitors having a positive design constant $g_n$ fixing the magnitude of its susceptance, and the $n$th section, where $n$ is successively equal to 1, 2, 3 and 4, having a normalized image impedance $w_n$ at each end, where for each of said sections $$l_n = \varphi_n / 2\beta_q$$

$$g_n = \tan(\pi - \varphi_n) / \sqrt{(f_q/f_c)^2 - 1}$$

and the angles $\varphi_1$, $\varphi_2$, $\varphi_3$ and $\varphi_4$ corresponding respectively to the filter sections 1, 2, 3 and 4 satisfy at said frequency the following equations:

$$w_1 = p_1^{1/2} p_2^{-1/4} w_a^{7/8} w_b^{1/8} U_4$$

$$w_2 = p_1^{1/2} p_2^{1/4} w_a^{5/8} w_b^{3/8} U_4$$

$$w_3 = p_1^{-1/2} p_2^{3/4} w_a^{3/8} w_b^{5/8} U_4$$

and $$w_4 = p_1^{-1/2} p_2^{1/4} w_a^{1/8} w_b^{7/8} U_4$$

where $$U_4 = \sqrt{\frac{D_1 + p_2^{1/2}(w_b/w_a)^{1/4} D_2 + p_1 D_3 + p_1 p_2^{-1/2}(w_b/w_a)^{1/4} D_4}{p_1 p_2^{-1/2}(w_b/w_a)^{1/4} D_1 + p_1 p_2^{-1} D_2 + p_2^{-1/2}(w_b/w_a)^{1/4} D_3 + D_4}}$$

where $p_1$ and $p_2$ are arbitrary positive constants and $w_1$, $w_2$, $w_3$ and $w_4$ correspond respectively to the filter sections 1, 2, 3 and 4, and $$D_n = \frac{\varphi_n}{\sin(\varphi_n - \pi)} + \cos(\varphi_n - \pi)$$

$$w_n = \tan(-\varphi_n/2)$$

for said first type of section; and $$w_n = \sin(-\varphi_n)$$

for said second type of section.

39. A filter in accordance with claim 38 in which the constants $p_1$ and $p_2$ are each approximately equal to unity.

40. A filter in accordance with claim 38 in which $w_a$ is larger than unity, and $w_b$ is smaller than unity.

OTTO J. ZOBEL.

REFERENCES CITED

The following references are of record in the file of this patent:

UNITED STATES PATENTS

| Number | Name | Date |
|---|---|---|
| 2,396,044 | Fox | Mar. 5, 1946 |
| 2,432,093 | Fox | Dec. 9, 1947 |
| 2,540,488 | Mumford | Feb. 6, 1951 |